US011811015B2

(12) United States Patent
Chujo et al.

(10) Patent No.: US 11,811,015 B2
(45) Date of Patent: Nov. 7, 2023

(54) POWER STORAGE MODULE

(71) Applicant: KABUSHIKI KAISHA TOYOTA JIDOSHOKKI, Kariya (JP)

(72) Inventors: Yuki Chujo, Kariya (JP); Takayuki Hirose, Kariya (JP); Tomohiro Nakamura, Kariya (JP); Masahiro Yamada, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 737 days.

(21) Appl. No.: 16/970,420

(22) PCT Filed: Sep. 18, 2018

(86) PCT No.: PCT/JP2018/034506
§ 371 (c)(1),
(2) Date: Aug. 17, 2020

(87) PCT Pub. No.: WO2019/167318
PCT Pub. Date: Sep. 6, 2019

(65) Prior Publication Data
US 2020/0373607 A1 Nov. 26, 2020

(30) Foreign Application Priority Data
Feb. 28, 2018 (JP) ................................ 2018-034642

(51) Int. Cl.
| *H01M 10/0525* | (2010.01) |
| *H01M 10/02* | (2006.01) |
| *H01G 11/80* | (2013.01) |
| *H01G 11/24* | (2013.01) |
| *H01M 10/04* | (2006.01) |
| *H01M 10/34* | (2006.01) |
| *H01M 50/566* | (2021.01) |

(52) U.S. Cl.
CPC ........ *H01M 10/0418* (2013.01); *H01G 11/24* (2013.01); *H01G 11/80* (2013.01); *H01M 10/02* (2013.01); *H01M 10/0468* (2013.01); *H01M 10/0525* (2013.01); *H01M 10/345* (2013.01); *H01M 50/566* (2021.01)

(58) Field of Classification Search
CPC ............ H01M 10/0418; H01M 10/02; H01M 10/0468; H01M 10/0525; H01M 10/345; H01M 50/566; H01M 50/103; H01M 50/184; H01M 50/193; H01G 11/24; H01G 11/80; H01G 11/12; H01G 11/78; Y02P 70/50; Y02T 10/70; Y02E 60/10
See application file for complete search history.

(56) References Cited

U.S. PATENT DOCUMENTS

| 7,332,244 | B2 | 2/2008 | Uemoto et al. | |
| 8,703,326 | B2 | 4/2014 | Guen et al. | |
| 2004/0253512 | A1 | 12/2004 | Watanabe et al. | |
| 2008/0131775 | A1* | 6/2008 | Takayama | H01M 10/052 429/210 |
| 2012/0070715 | A1* | 3/2012 | Obika | H01M 10/0418 29/623.2 |
| 2016/0197373 | A1* | 7/2016 | Shaffer, II | H01M 50/463 429/210 |
| 2018/0053926 | A1* | 2/2018 | Shaffer, II | H01M 50/44 |
| 2018/0069222 | A1* | 3/2018 | Shaffer, II | H01M 10/044 |

FOREIGN PATENT DOCUMENTS

JP 2005-005163 A 1/2005

OTHER PUBLICATIONS

Communication dated Sep. 10, 2021, from the Intellectual Property of India in application No. 202017035934.
International Preliminary Report on Patentability with translation of Written Opinion dated Sep. 1, 2020, in International Application No. PCT/JP2018/034506.

* cited by examiner

Primary Examiner — Muhammad S Siddiquee
(74) Attorney, Agent, or Firm — Sughrue Mion, PLLC

(57) ABSTRACT

Provided is an electricity-storage module including: a stacked body that includes electrodes which are stacked along a first direction; a sealing body that is provided to the stacked body so as to surround a peripheral edge portion of the electrodes, forms an inner space that stores an electrolytic solution between the electrodes adjacent to each other along the first direction, and seals the inner space; and a reinforcing body that is provided in the electrodes so as to suppress deformation of the electrodes. The electrodes include bipolar electrodes and a negative terminal electrode, the negative terminal electrode includes the electrode plate and a negative electrode provided on the second surface, and is disposed at one end of the stacked body in the first direction such that the second surface faces an inner side of the stacked body in the first direction.

10 Claims, 8 Drawing Sheets

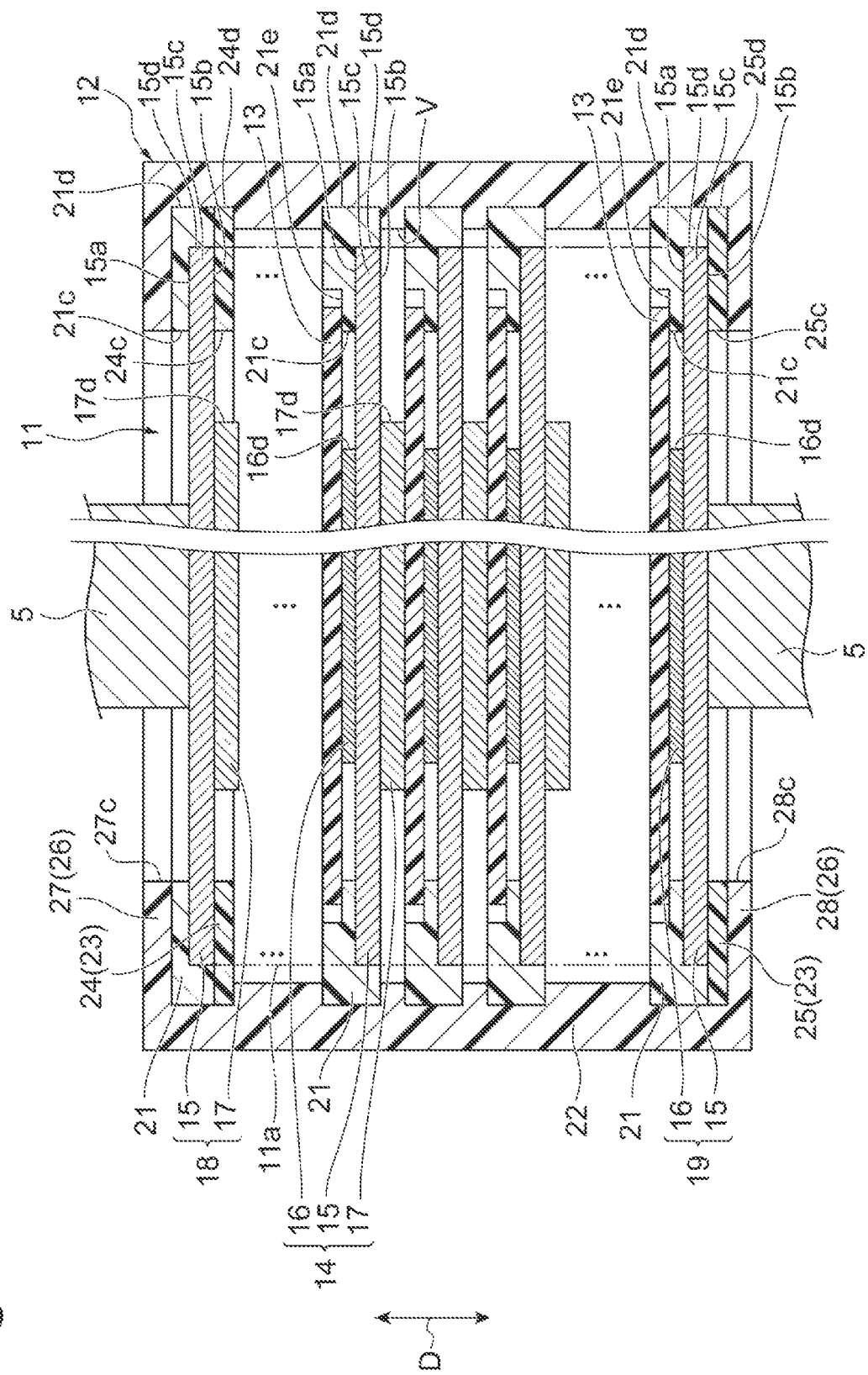

POWER STORAGE MODULE

CROSS REFERENCE TO RELATED APPLICATIONS

This application is a National Stage of International Application No. PCT/JP2018/034506 filed Sep. 18, 2018, claiming priority based on Japanese Patent Application No. 2018-034642 filed Feb. 28, 2018.

TECHNICAL FIELD

An aspect of the present invention relates to an electricity-storage module.

BACKGROUND ART

Patent Literature 1 discloses a bipolar battery. The bipolar battery includes a battery element including a plurality of sheets of bipolar electrodes which are stacked. The bipolar electrode includes a current collector, a positive electrode layer provided on one surface of the current collector, and a negative electrode layer provided on the other surface of the current collector. In addition, the bipolar battery includes a resin group that covers an outer side of the battery element. The resin group is provided to air-tightly (liquid-tightly) maintain the battery element so that an electrolytic solution inside the battery and the like are not leaked to the outside.

CITATION LIST

Patent Literature

Patent Literature 1: Japanese Unexamined Patent Publication No. 2005-005163

SUMMARY OF INVENTION

Technical Problem

In the bipolar battery, for example, when an inner pressure rises, a load is canceled in the bipolar electrode located at an intermediate portion, but the load is not canceled in an outermost bipolar electrode, and thus there is a concern that the current collector and the resin group may be deformed. In this case, a gap occurs between the resin group and the current collector, and thus leakage of the electrolytic solution may occur or breakage of the resin group may occur. Particularly, in a case where the negative electrode layer is located on the outermost portion, and the electrolytic solution is composed of an aqueous alkali solution, leakage of the electrolytic solution from the gap is likely to occur clue to a so-called alkali creep phenomenon. In this state, it is preferable to improve reliability by suppressing the leakage or breakage in an electricity-storage module such as the bipolar battery.

Here, an object of an aspect of the invention is to provide an electricity-storage module capable of improving reliability.

Solution to Problem

According to an aspect of the present invention, there is provided an electricity-storage module including: a stacked body that includes a plurality of electrodes which are stacked along a first direction; a sealing body that is provided to the stacked body so as to surround a peripheral edge portion of the electrodes, forms an inner space that stores an electrolytic solution between the electrodes adjacent to each other along the first direction, and seals the inner space; and a reinforcing body that is provided in the electrodes so as to suppress deformation of the electrodes. The electrodes include a plurality of bipolar electrodes, and a negative terminal electrode, the bipolar electrode includes an electrode plate, a positive electrode provided on a first surface of the electrode plate, and a negative electrode provided on a second surface of the electrode plate which is opposite to the first surface, the negative terminal electrode includes the electrode plate and a negative electrode provided on the second surface, and is disposed at one end of the stacked body in the first direction such that the second surface faces an inner side of the stacked body in the first direction, the sealing body includes a plurality of first sealing portions welded to the first surface at a peripheral edge portion of the electrodes, and a second sealing portion joined to the first sealing portion so as to surround the plurality of first sealing portions from an outer side in the first direction, and the reinforcing body includes a first reinforcing portion joined to the second surface of the negative terminal electrode at a peripheral edge portion of the negative terminal electrode.

In the electricity-storage module, the electrodes include the plurality of bipolar electrodes, and the negative terminal electrode that is disposed at one end of the stacked body in the first direction. The sealing body includes the plurality of first sealing portions welded to the first surface of the electrodes in the peripheral edge portion of the electrodes, and the second sealing portion joined to the first sealing portions so as to surround the plurality of first sealing portions from an outer side in the first direction. The reinforcing body includes the first reinforcing portion joined to the second surface of the negative terminal electrode. In this manner, in the bipolar electrodes, the first sealing portion is welded to the first surface, in contrast, in the negative terminal electrode, the first sealing portion is welded to the first surface and the first reinforcing portion is joined to the second surface. According to this, deformation of the negative terminal electrode is suppressed, and leakage of the electrolytic solution or breakage on the negative terminal electrode side is suppressed. As a result, according to the electricity-storage module, reliability can be improved.

In the electricity-storage module according to the aspect of the invention, the electrodes may further include a positive terminal electrode, the positive terminal electrode may include the electrode plate and a positive electrode provided on the first surface, and may be disposed at the other end of the stacked body in the first direction such that the first surface faces an inner side of the stacked body in the first direction, and the reinforcing body may further include a second reinforcing portion joined to the second surface of the positive terminal electrode at a peripheral edge portion of the positive terminal electrode. In this case, in the bipolar electrodes, the first sealing portion is welded to the first surface, in contrast, in the positive terminal electrode, the first sealing portion is welded to the first surface and the second reinforcing portion is joined to the second surface, as in the negative terminal electrode side. According to this, deformation of the positive terminal electrode is suppressed, and leakage of the electrolytic solution or breakage on the positive terminal electrode side is suppressed. According to this, the reliability of the electricity-storage module is further improved.

In the electricity-storage module according to the aspect of the invention, the reinforcing body may be joined to the second sealing portion in combination with the first sealing portion. In this case, in addition to the first sealing portion, the reinforcing body is applicable to sealing of the inner space.

In the electricity-storage module according to the aspect of the invention, the second sealing portion may include an overlapping portion provided in one end and the other end of the stacked body so as to overlap the electrodes when viewed from the first direction. In this case, the negative terminal electrode (and the positive terminal electrode) is reinforced by the overlapping portion, and thus deformation of the negative terminal electrode (and the positive terminal electrode) is more reliably suppressed.

In the electricity-storage module according to the aspect of the invention, tensile strength of a material of the reinforcing body may be greater than tensile strength of a material of the first sealing portion. In this case, the negative terminal electrode (and the positive terminal electrode (the same shall apply hereinafter)) is more reliably reinforced by the reinforcing body, and thus deformation of the negative terminal electrode is more reliably suppressed.

In the electricity-storage module according to the aspect of the invention, Young's modulus of the material of the reinforcing body may be greater than Young's modulus of the material of the first sealing portion. In this case, the negative terminal electrode is more reliably reinforced by the reinforcing body, and thus deformation of the negative terminal electrode is more reliably suppressed.

In the electricity-storage module according to the aspect of the invention, the material of the reinforcing body may be polypropylene. In this case, the negative terminal electrode is more reliably reinforced by the reinforcing body, and thus deformation of the negative terminal electrode is more reliably suppressed.

In the electricity-storage module according to the aspect of the invention, the material of the reinforcing body may be oriented polypropylene. In this case, the negative terminal electrode is more reliably reinforced by the reinforcing body, and thus deformation of the negative terminal electrode is more reliably suppressed.

In the electricity-storage module according to the aspect of the invention, the material of the reinforcing body may be biaxially oriented polypropylene. In this case, the negative terminal electrode is more reliably reinforced by the reinforcing body, and thus deformation of the negative terminal electrode is more reliably suppressed.

In the electricity-storage module according to the aspect of the invention, the material of the reinforcing body may be the same as the material of the first sealing portion. In this case, materials can be made common.

Advantageous Effects of Invention

According to the aspects of the invention, it is possible to provide an electricity-storage module capable of improving reliability.

BRIEF DESCRIPTION OF DRAWINGS

FIG. 8 is a schematic cross-sectional view illustrating an internal configuration of an electricity-storage module according to a modification example.

DESCRIPTION OF EMBODIMENTS

Figure 1:
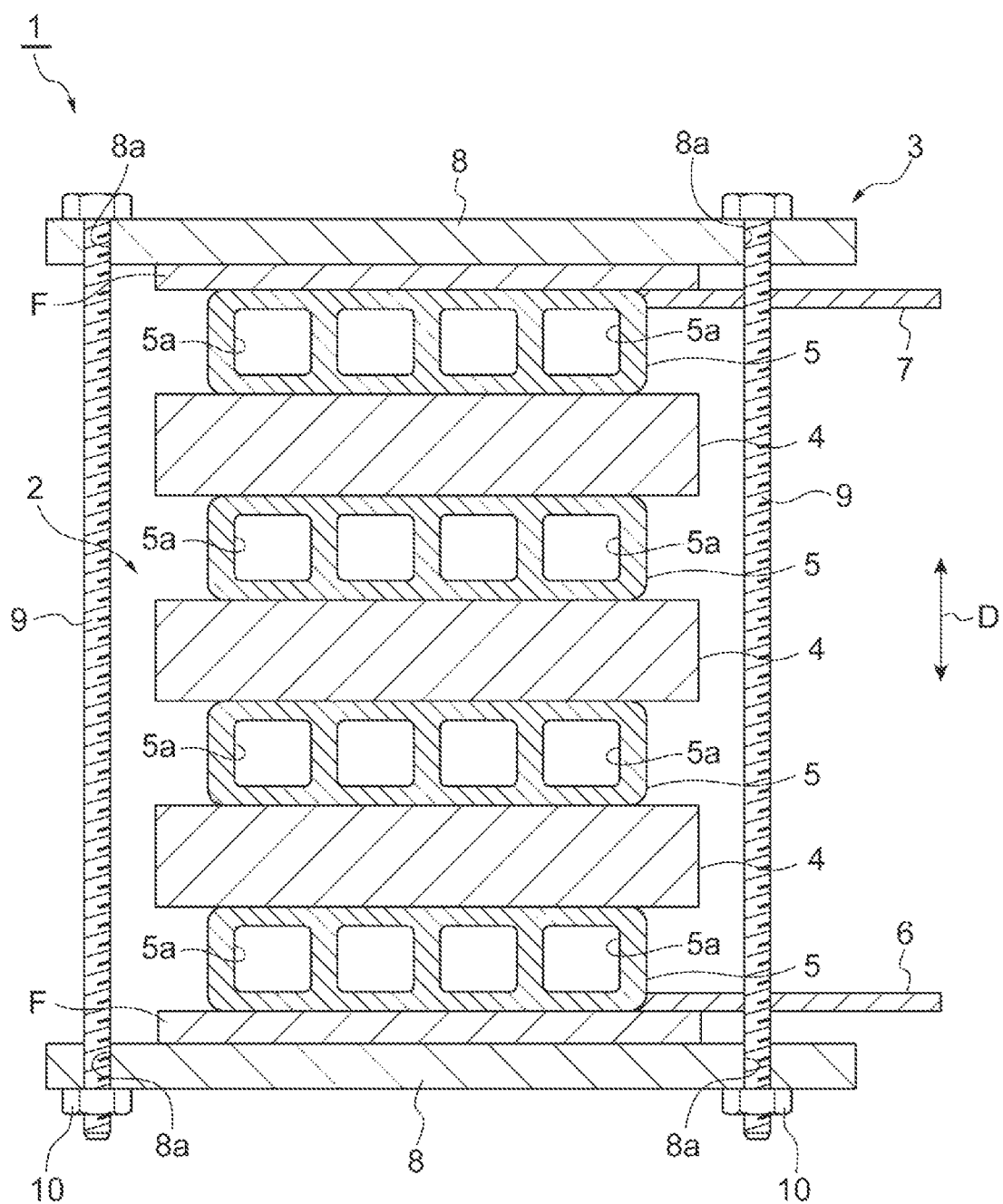
FIG. 1 is a schematic cross-sectional view illustrating an embodiment of an electricity-storage device.

Hereinafter, an embodiment will be described in detail with reference to the drawings. Note that, the same reference numeral will be given to the same or equivalent portion in the drawings, and redundant description thereof will be omitted.

FIG. 1 is a schematic cross-sectional view illustrating an embodiment of an electricity-storage device. As illustrated in FIG. 1, an electricity-storage device 1 may be used, for example, as batteries of various vehicles such as a forklift, a hybrid vehicle, and an electric vehicle. The electricity-storage device 1 includes a module stacked body 2 including a plurality of electricity-storage modules 4 which are stacked, and a constraining member 3 that applies a constraining load to the module stacked body 2 in a stacking direction thereof (here, an electrode stacking direction D in an electrode stacked body 11 to be described later).

The module stacked body 2 includes the plurality of (here, three) electricity-storage modules 4, and a plurality of (here, four conductive plates 5. Each of the electricity-storage modules 4 is a bipolar battery, and has a rectangular shape when viewed from a stacking direction D. For example, the electricity-storage module 4 is a secondary battery such as a nickel-hydrogen secondary battery and a lithium ion secondary battery, or an electric double-layer capacitor. In the following description, the nickel-hydrogen secondary battery will be exemplified.

The electricity-storage modules 4 adjacent to each other in the stacking direction D are electrically connected to each other through each of the conductive plates 5. The conductive plate 5 is disposed between the electricity-storage modules 4 adjacent to each other in the stacking direction D, and on an outer side of the electricity-storage modules 4 located at stacking ends in the stacking direction D. A positive electrode terminal 6 is connected to one of the conductive plates 5 disposed on an outer side of the electricity-storage modules 4 located at the stacking ends in the stacking direction D, and a negative electrode terminal 7 is connected to the other conductive plate 5 between the conductive plates 5 disposed on an outer side of the electricity-storage modules 4 located at the stacking ends in the stacking direction D. For example, the positive electrode terminal 6 and the negative electrode terminal 7 extend from edge portions of the conductive plates 5 in a direction that intersects the stacking direction D. Charging and discharging of the electricity-storage device 1 are carried out by the positive electrode terminal 6 and the negative electrode terminal 7.

A plurality of flow passages 5a through which a coolant such as air is circulated are provided inside the conductive plate 5. For example, the flow passages 5a extend along a direction that intersects (is perpendicular) to the stacking direction D and the extension direction of the positive electrode terminal 6 and the negative electrode terminal 7. The conductive plate 5 has a function as a heat dissipation plate for dissipating heat generated in the electricity-storage module 4 by circulating the coolant through the flow passages 5a in addition to a function as a connection member that electrically connects the electricity-storage modules 4 to each other. Note that, in the example illustrated in FIG. 1, an area of the conductive plate 5 when viewed from the stacking direction D is smaller than an area of the electricity-storage module 4. However, the area of the conductive plate 5 may be equal to the area of the electricity-storage module 4 or may be greater than the area of the electricity-storage module 4 from the viewpoints of an improvement of heat dissipation.

The constraining member 3 includes a pair of end plates 8 between which the module stacked body 2 is interposed in a stacking direction D, and a fastening bolt 9 and a nut 10 which fasten the end plates 8. Each of the end plates 8 is a rectangular metal plate having an area that is slightly larger than the areas of the electricity-storage module 4 and the conductive plate 5 when viewed from the stacking direction D. A film F having electrical insulation property is provided on an inner surface of the end plate 8 (a surface facing the module stacked body 2 side) in the stacking direction D. The end plate 8 and the conductive plate 5 are insulated by the film F.

An insertion hole 8a is provided in an edge portion of the end plate 8 on an outer periphery side in comparison to a portion that overlaps the module stacked body 2 in the stacking direction D. The fastening bolt 9 passes through the insertion hole 8a of one of the end plates 8 toward the insertion hole 8a of the other end plate 8, and the nut 10 is screwed to a tip end portion of the fastening bolt 9 that protrudes from the insertion hole 8a of the other end plate 8. According to this, the electricity-storage module 4 and the conductive plate 5 are sandwiched by the end plates 8 to form a unit as the module stacked body 2, and a constraining load is applied to the module stacked body 2 in the stacking direction D.

Figure 2:
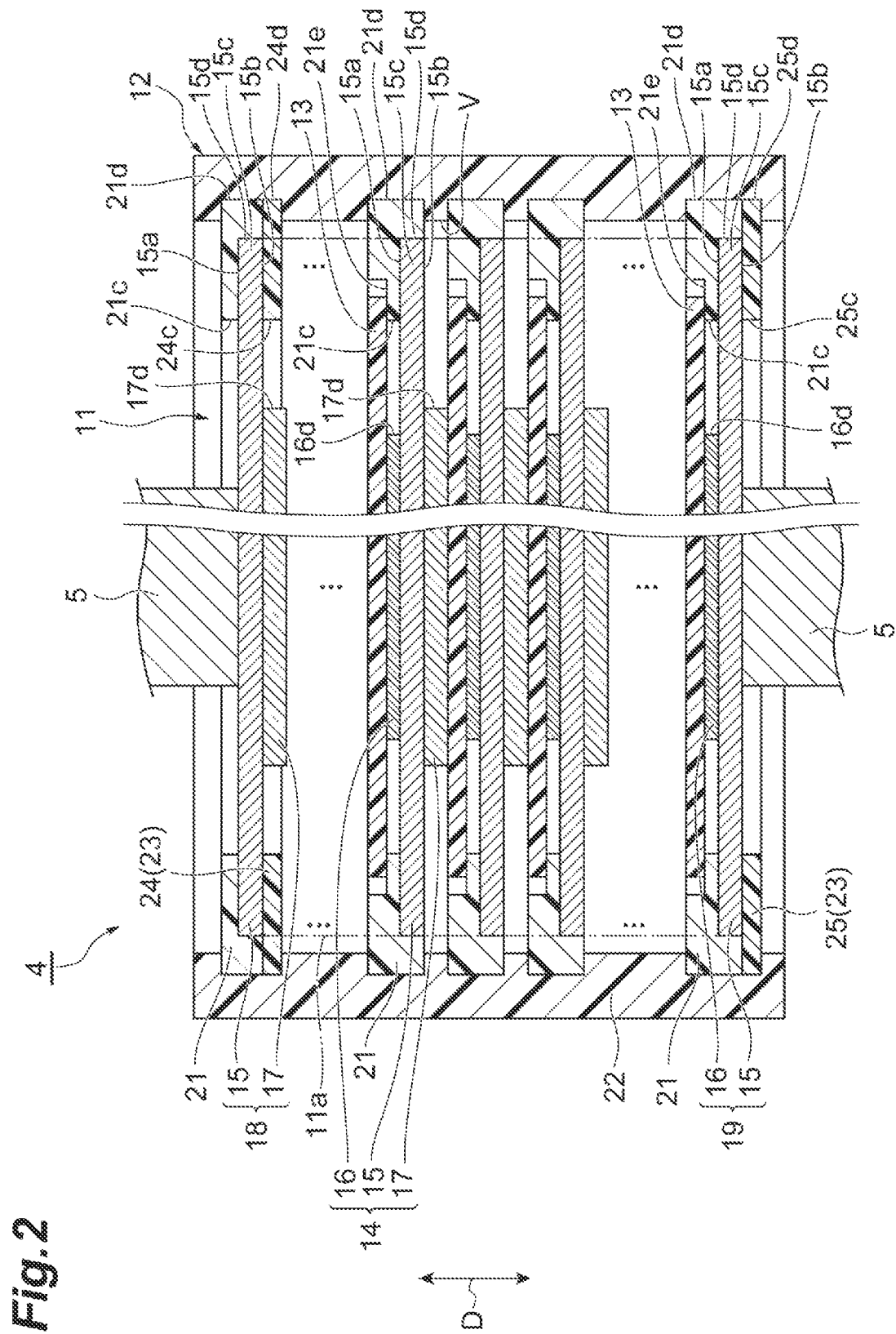
FIG. 2 is a schematic cross-sectional view illustrating an internal configuration of the electricity-storage module illustrated in FIG. 1.

Next, a configuration of the electricity-storage module 4 will be described in detail. FIG. 2 is a schematic cross-sectional view illustrating an internal configuration of the electricity-storage module 4 illustrated in FIG. 1. As illustrated in FIG. 2, the electricity-storage module 4 includes an electrode stacked body (stacked body) 11, a sealing body 12 that seals the electrode stacked body 11 and is formed from a resin, and a reinforcing body 23. The electrode stacked body 11 includes a separator 13, and a plurality of electrodes (a plurality of bipolar electrodes 14, a single negative terminal electrode 18, and a single positive terminal electrode 19) stacked along the stacking direction D (first direction) through the separator 13. Here, the stacking direction D of the electrode stacked body 11 matches the stacking direction of the module stacked body 2. The electrode stacked body 11 includes a side surface 11a that extends in the stacking direction D. As an example, the side surface 11a is configured as a set of end surfaces (surfaces connecting a first surface 15a, and a second surface 15b) of electrode plates 15 to be described later.

Each of the bipolar electrodes 14 includes each of the electrode plates 15, a positive electrode 16 provided on the first surface 15a of the electrode plate 15, and a negative electrode 17 provided on the second surface 15b opposite to the first surface 15a of the electrode plate 15. For example, the electrode plate 15 is formed from a metal such as nickel or nickel plated steel plate. As an example, the electrode plate 15 is rectangular metal foil formed from nickel. The electrode plate 15 includes a rectangular outer edge 15d when viewed from the stacking direction D.

A surface of the electrode plate 15 is roughened. Here, the entire surface of the electrode plate 15 including the first surface 15a, the second surface 15b, and an end surface connecting the first surface 15a and the second surface 15b is roughened. For example, the surface of the electrode plate 15 is roughened by forming a plurality of protrusions through electroplating processing. In this manner, in a case where the electrode plate 15 is roughened, at a joining interface between the electrode plate 15, and a first resin portion 21, a first reinforcing portion 24, and a second reinforcing portion 25 to be described later, the first resin portion 21, the first reinforcing portion 24, and the second reinforcing portion 25 in a molten state enters a concave portion formed by the roughening, and an anchor effect is exhibited. According to this, it is possible to improve a coupling force between the electrode plate 15, and the first resin portion 21, the first reinforcing portion 24, and the second reinforcing portion 25. At least, in a case where a peripheral edge portion 15c in the first surface 15a is roughened, an effect of improving the coupling force is obtained. For example, the protrusions have a shape that expands from a base end side to a tip end side. In this case, a cross-sectional shape between the protrusions adjacent to each other becomes an under-cut shape, and the anchor effect is likely to occur.

The positive electrode 16 is a positive electrode active material layer that is formed by coating a positive electrode active material on the electrode plate 15. Examples of the positive electrode active material that constitutes the positive electrode 16 include nickel hydroxide. The positive electrode 16 includes a rectangular outer edge 16d when viewed from the stacking direction D, The negative electrode 17 is a negative electrode active material layer that is formed by coating a negative electrode active material on the electrode plate 15. Examples of the negative electrode active material that constitutes the negative electrode 17 include a hydrogen occluding alloy. The negative electrode 17 includes a rectangular outer edge 17d when viewed from the stacking direction D.

In this embodiment, a formation region of the negative electrode 17 on the second surface 15b of the electrode plate 15 is slightly greater than a formation region of the positive electrode 16 on the first surface 15a of the electrode plate 15. That is, the outer edge 17d of the negative electrode 17 is slightly greater than the outer edge 16d of the positive electrode 16. The peripheral edge portion 15c of the electrode plate 15 has a rectangular frame shape, and is an uncoated region that is not coated with the positive electrode active material and the negative electrode active material, That is, when viewed from the stacking direction D, the peripheral edge portion 15c of the electrode plate 15 is a portion other than a region in which the positive electrode 16 and the negative electrode 17 are formed in the electrode plate 15, and is a portion that surrounds the positive electrode 16 and the negative electrode 17. Note that, surfaces of the bipolar electrode 14, the negative terminal electrode 18, and the positive terminal electrode 19 include the first surface 15a and the second surface 15b in the peripheral edge portion 15c of the electrode plate 15.

In the electrode stacked body 11, the positive electrode 16 of one of the bipolar electrodes 14 faces the negative electrode 17 of another bipolar electrode 14 adjacent in the stacking direction D with the separator 13 interposed therebetween. In the electrode stacked body 11, the negative electrode 17 of one of the bipolar electrodes 14 faces the positive electrode 16 of another bipolar electrode 14 adjacent with the separator 13 interposed therebetween in the stacking direction D.

The negative terminal electrode 18 includes the electrode plate 15, and the negative electrode 17 provided on the second surface 15b of the electrode plate 15. The negative terminal electrode 18 does not include the positive electrode 16. That is, an active material layer is not provided on the first surface 15a of the electrode plate 15 of the negative terminal electrode 18 (that is, the entirety of the first surface 15a of the negative terminal electrode 18 is exposed). The negative terminal electrode 18 is disposed at one end in the stacking direction D such that the second surface 15b faces an inner side of the electrode stacked body 11 in the stacking direction D (a central side with respect to the stacking direction D), The negative electrode 17 of the negative terminal electrode 18 faces the positive electrode 16 of the bipolar electrode 14 on one end in the stacking direction D through the separator 13.

The positive terminal electrode 19 includes the electrode plate 15, and the positive electrode 16 provided on the first surface 15a of the electrode plate 15. The positive terminal electrode 19 does not include the negative electrode 17. That is, an active material layer is not provided on the second surface 15b of the electrode plate 15 of the positive terminal electrode 19 (that is, the entire of the second surface 15b of the positive terminal electrode 19 is exposed). The positive terminal electrode 19 is disposed at the other end in the stacking direction D such that the first surface 15a faces an inner side of the electrode stacked body 11 in the stacking direction D. The positive electrode 16 of the positive terminal electrode 19 faces the negative electrode 17 of the bipolar electrode 14 at the other end in the stacking direction D through the separator 13.

A conductive plate 5 is in contact with the first surface 15a of the electrode plate 15 of the negative terminal electrode 18. In addition, a conductive plate 5 of an adjacent electricity-storage module 4 is in contact with the second surface 15b of the electrode plate 15 of the positive terminal electrode 19. A constraining load applied from the constraining member 3 is applied to the electrode stacked body 11 from the negative terminal electrode 18 and the positive terminal electrode 19 through the conductive plates 5. That is, the conductive plates 5 function also as a constraining member that applies the constraining load to the electrode stacked body 11 along the stacking direction D.

For example, the separator 13 is formed in a sheet shape. Examples of the separator 13 include a porous film formed from a polyolefin-based resin such as polyethylene (PE) and polypropylene (PP), woven or nonwoven fabric formed from polypropylene, polyethylene terephthalate (PET), methyl cellulose, and the like. In addition, the separator 13 may be reinforced with a vinylidene fluoride resin compound or the like. Note that, the separator 13 is not limited to the sheet shape, and a bag-shaped separator may be used.

For example, the sealing body 12 is formed by an insulating resin in a tubular shape having an approximately rectangular cross-section as a whole. The sealing body 12 is provided along the side surface 11a of the electrode stacked body 11 so as to surround a plurality of the peripheral edge portions 15c. The sealing body 12 holds the peripheral edge portion 15c. The sealing body 12 includes a plurality of first resin portions (a plurality of first sealing portions) 21 which are welded to the first surfaces 15a and the end surfaces in a plurality of the peripheral edge portions 15c of the respective electrodes, and a single second resin portion (second sealing portion) 22 that is joined to the first resin portions 21 so as to surround the first resin portions 21 from an outer side in the stacking direction D along the side surface 11a of the electrode stacked body 11.

Figure 3:
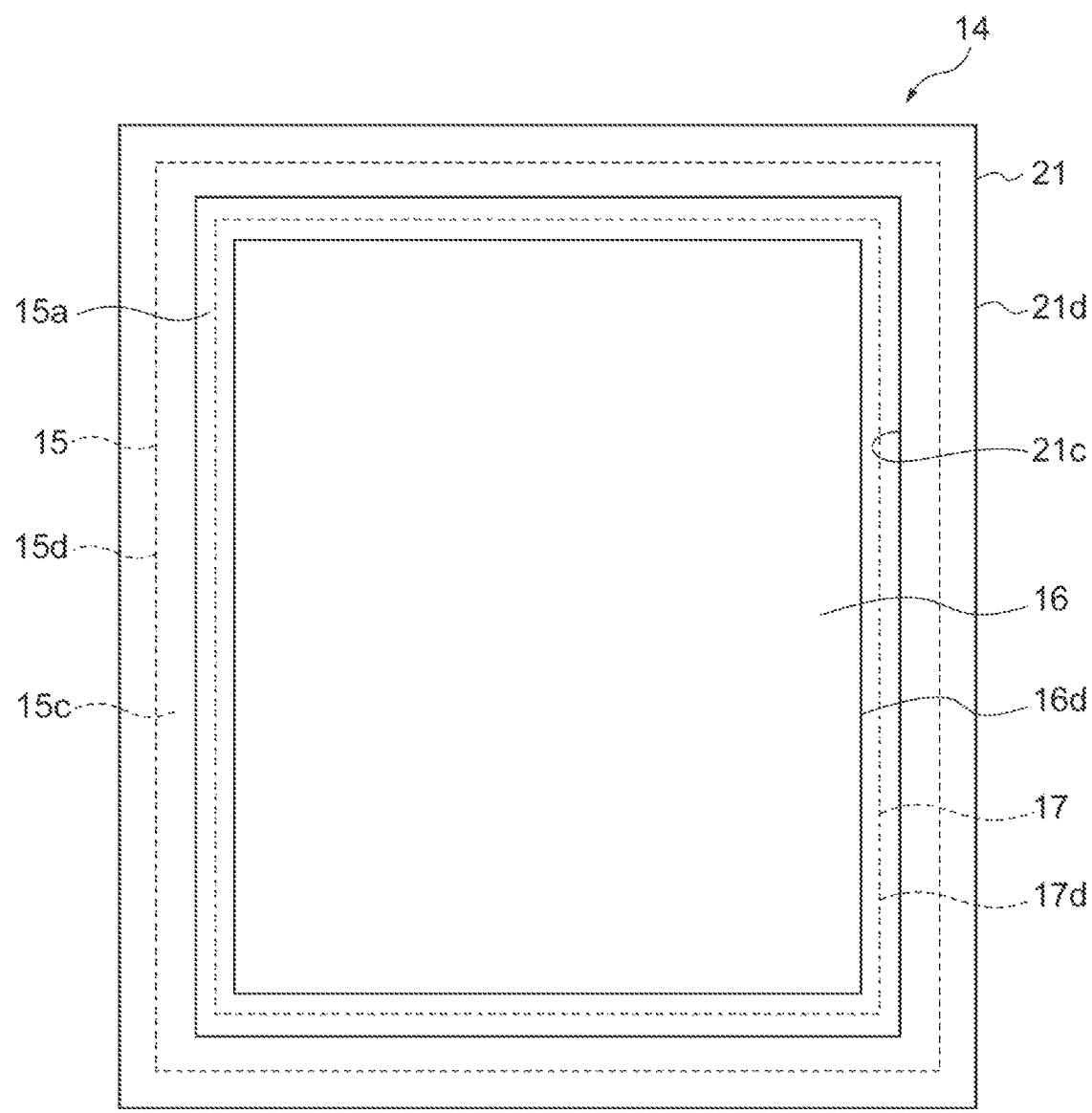
FIG. 3 is a plan view of a bipolar electrode illustrated in FIG. 2.
Figure 4:
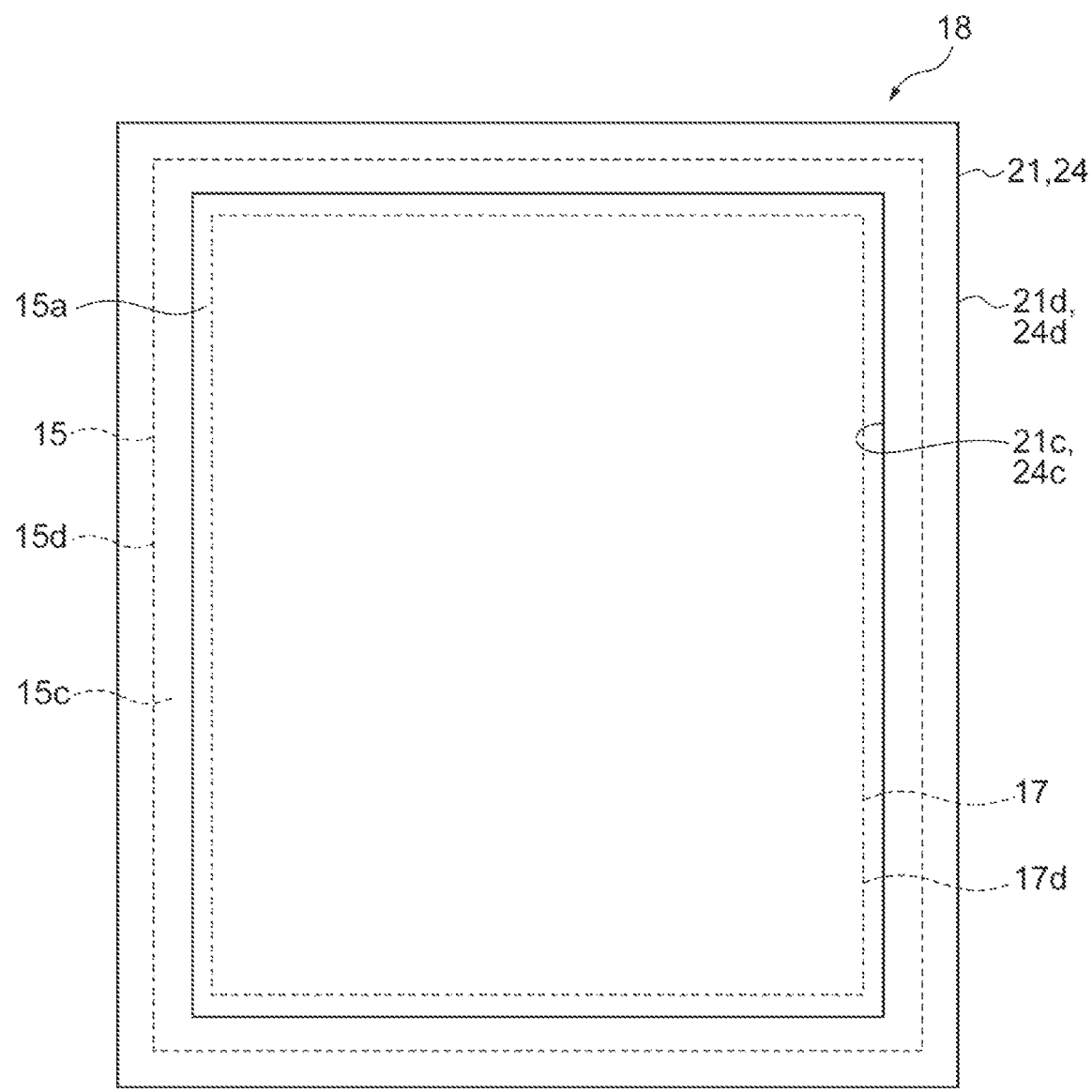
FIG. 4 is a plan view of a negative terminal electrode illustrated in FIG. 2.
Figure 5:
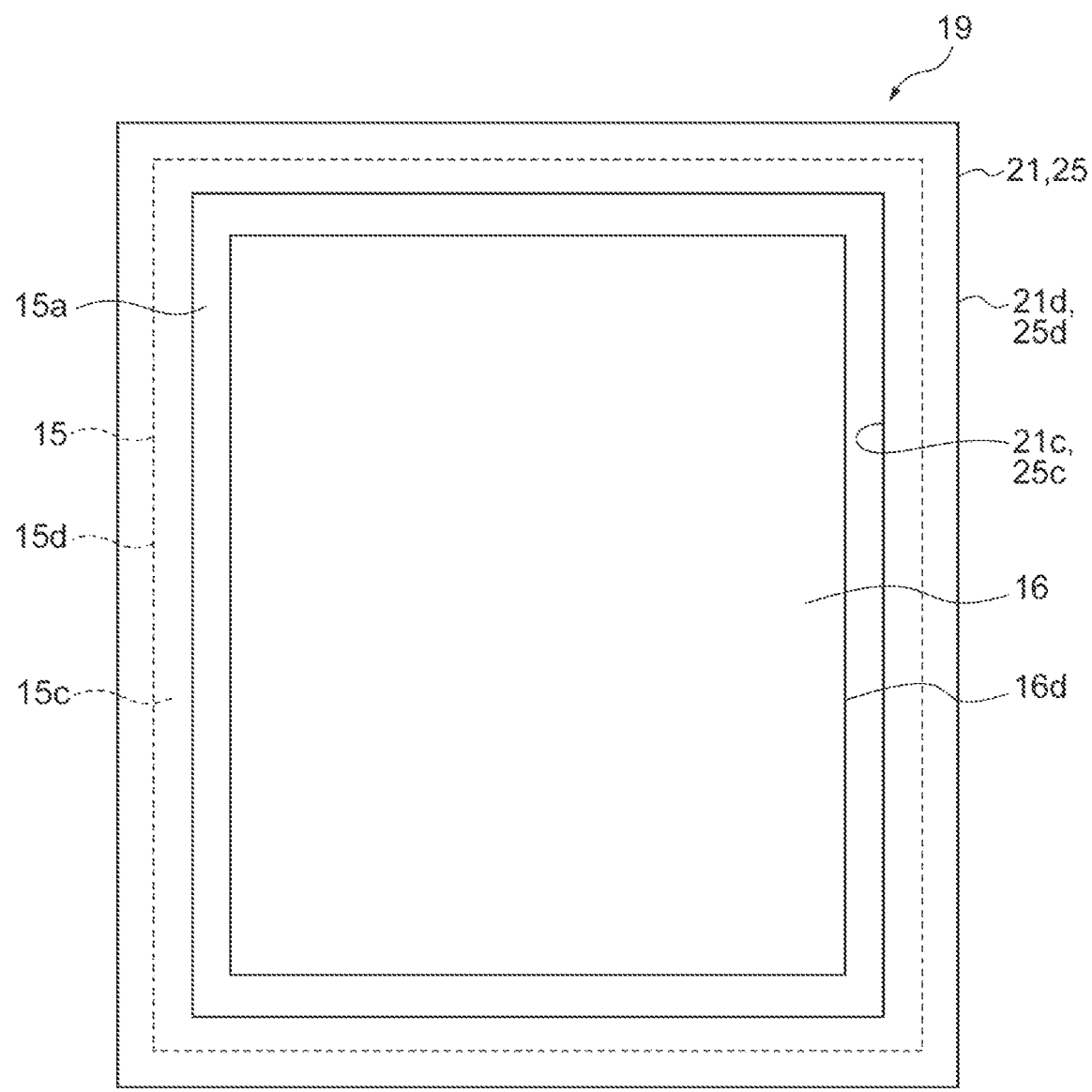
FIG. 5 is a plan view of a positive terminal electrode illustrated in FIG. 2.

FIG. 3 is a view illustrating the bipolar electrode 14 to which the first resin portion 21 is welded when viewed from the stacking direction D. FIG. 4 is a view illustrating the negative terminal electrode 18 to which the first resin portion 21 and a first reinforcing portion 24 to be described later are welded when viewed from the stacking direction D. FIG. 5 is a view illustrating the positive terminal electrode 19 to which the first resin portion 21 and a second reinforcing portion 25 to be described later are welded when viewed from the stacking direction D.

As illustrated in FIG. 2 to FIG. 5, in the bipolar electrode 14, the negative terminal electrode 18, and the positive terminal electrode 19, the negative electrode 17 is slightly smaller than the electrode plate 15. That is, an outer edge 17d of the negative electrode 17 is located on a further inner side in comparison to the outer edge 15d of the electrode plate 15, The positive electrode 16 is slightly smaller than the negative electrode 17, That is, the outer edge 16d of the positive electrode 16 is located on a further inner side in comparison to the outer edge 17d of the negative electrode 17. Note that, the inner side represents a central side of the electricity-storage module 4 when viewed from the stacking direction D. The outer side represents a side that is spaced apart from the center of the electricity-storage module 4 when viewed from the stacking direction D.

When viewed from the stacking direction D, the first resin portions 21 have a rectangular frame shape and are continuously provided over the entire periphery of the peripheral edge portions 15c of the bipolar electrodes 14, the negative terminal electrode 18, and the positive terminal electrode 19. The first resin portions 21 are films having a predetermined thickness (length in the stacking direction D). Each of the first resin portions 21 includes a rectangular inner edge 21c and a rectangular outer edge 21d when viewed from the stacking direction D. The first resin portion 21 is welded to a surface of each of the bipolar electrodes 14, the negative terminal electrode 18, and the positive terminal electrode 19 at least in the peripheral edge portion 15c of each of the bipolar electrodes 14, the negative terminal electrode 18, and the positive terminal electrode 19. Specifically, the first resin portion 21 is welded and air-tightly (liquid-tightly) joined to the first surface 15a and the end surface of each of the bipolar electrodes 14, the negative terminal electrode 18, and the positive terminal electrode 19.

The outer edge 21d of the first resin portion 21 is located on an outer side of the outer edge 15d of the electrode plate 15. The inner edge 21c of the first resin portion 21 is located between the outer edge 15d of the electrode plate 15 and the outer edge 17d of the negative electrode 17. A stepped portion 21e is formed in the first resin portion 21 that is welded to the bipolar electrode 14 and the positive terminal electrode 19. The stepped portion 21e is formed on the inner edge 2 side that is opposite to an electrode in the first resin portion 21. An edge portion of the separator 13 is placed on the stepped portion 21e.

The outer edges 15d of the electrode plates 15 of the bipolar electrodes 14, the negative terminal electrode 18, and the positive terminal electrode 19 match each other. The outer edges 17d of the negative electrodes 17 of the bipolar electrodes 14 and the negative terminal electrode 18 match each other. The outer edges 16d of the positive electrodes 16 of the bipolar electrode 14 and the positive terminal electrode 19 match each other. The inner edges 21c of the plurality of first resin portions 21 match each other. The outer edges 21d of the plurality of first resin portions 21 match each other.

The reinforcing body 23 is provided in electrodes (here, the negative terminal electrode 18 and the positive terminal electrode 19) so as to suppress deformation of the electrodes. The reinforcing body 23 includes a first reinforcing portion 24 and a second reinforcing portion 25. The first reinforcing portion 24 is joined to the second surface 15b of the negative terminal electrode 18 at the peripheral edge portion 15c of the negative terminal electrode 18. The first reinforcing portion 24 is welded to the second surface 15b of the negative terminal electrode 18. The first reinforcing portion 24 is a film having a predetermined thickness (length in the stacking direction D).

The first reinforcing portion 24 has a rectangular frame shape when viewed form the stacking direction D, and is continuously provided over the entire periphery of the peripheral edge portion 15c of the negative terminal electrode 18. The first reinforcing portion 24 includes a rectangular inner edge 24c and a rectangular outer edge 24d when viewed from the stacking direction D. The inner edge 24c of the first reinforcing portion 24 matches the inner edge 21c of the first resin portion 21 when viewed from the stacking direction D. The outer edge 24d of the first reinforcing portion 24 matches the outer edge 21d of the first resin portion 21 when viewed from the stacking direction D. The negative terminal electrode 18 is sandwiched by the first resin portion 21 and the first reinforcing portion 24.

The second reinforcing portion 25 is joined to the second surface 15b of the positive terminal electrode 19 at the peripheral edge portion 15c of the positive terminal electrode 19. The second reinforcing portion 25 is welded to the second surface 15b of the positive terminal electrode 19. The second reinforcing portion 25 is the same as the first reinforcing portion 24. That is, the second reinforcing portion 25 is a film having a predetermined thickness (length in the stacking direction D).

The second reinforcing portion 25 has a rectangular frame shape when viewed from the stacking direction D, and is continuously provided over the entire periphery of the peripheral edge portion 15c of the positive terminal electrode 19. The second reinforcing portion 25 includes a rectangular inner edge 25c and a rectangular outer edge 25d when viewed from the stacking direction D. The inner edge 25c of the second reinforcing portion 25 matches the inner edge 21c of the first resin portion 21 when viewed form the stacking direction D, The outer edge 25d of the second reinforcing portion 25 matches the outer edge 21d of the first resin portion 21 when viewed from the stacking direction D. The positive terminal electrode 19 is sandwiched by the first resin portion 21 and the second reinforcing portion 25.

For example, each of the first resin portion 21, the first reinforcing portion 24, and the second reinforcing portion 25 is welded to the electrode plate 15 with ultrasonic waves or heat. An inner end portion of each of the first resin portion 21, the first reinforcing portion 24, and the second reinforcing portion 25 is located between the peripheral edge portions 15c of the electrode plates 15 adjacent to each other in the stacking direction D, and an outer end portion extends from the electrode plate 15 to an outer side when viewed from the stacking direction D. Each of the first resin portion 21, the first reinforcing portion 24, and the second reinforcing portion 25 is embedded in the second resin portion 22 at the outer end portion. The first resin portions 21 adjacent to each other along the stacking direction D are spaced apart from each other.

The second resin portion 22 is provided on an outer side of the electrode stacked body 11, the first resin portion 21, the first reinforcing portion 24, and the second reinforcing portion 25, and constitutes an outer wall (casing) of the electricity-storage module 4. For example, the second resin portion 22 is formed by injection molding of a resin, and extends over the entire length of the electrode stacked body 11 along the stacking direction D. The second resin portion 22 has a tubular shape (annular shape) that extends with the stacking direction D set as an axial direction. For example, the second resin portion 22 is welded (joined) to outer surfaces of the first resin portion 21, the first reinforcing portion 24, and the second reinforcing portion 25 with heat at the time of injection molding. The first reinforcing portion 24 and the second reinforcing portion 25 are surrounded by the second resin portion 22 in combination with the first resin portion 21, and are joined to the second resin portion 22.

The second resin portion 22 seals a portion between the bipolar electrodes 14 adjacent to each other along the stacking direction D, a portion between the negative terminal electrode 18 and the bipolar electrode 14 adjacent to each other along the stacking direction D, and a portion between the positive terminal electrode 19 and the bipolar electrode 14 adjacent to each other along the stacking direction D in combination with the first resin portions 21. According to this, an inner space V that is air-tightly (liquid-tightly) partitioned is formed between the bipolar electrodes 14, between the negative terminal electrode 18 and the bipolar electrode 14, and between the positive terminal electrode 19 and the bipolar electrode 14. For example, the inner space V stores an electrolytic solution (not illustrated) composed of an aqueous alkali solution such as an aqueous solution of potassium hydroxide. That is, the sealing body 12 including the first resin portion 21 and the second resin portion 22 forms the inner space V in which the electrolytic solution is stored between electrodes adjacent to each other along the stacking direction D, and seals the inner space V. The separator 13, the positive electrode 16, and the negative electrode 17 are impregnated with the electrolytic solution.

For example, the first reinforcing portion 24 and the second reinforcing portion 25 (reinforcing body 23 (the same shall apply hereinafter)) are formed from a resin. Tensile strength of a material of each of the first reinforcing portion 24 and the second reinforcing portion 25 is greater than tensile strength of a material of the first resin portion 21 and the second resin portion 22. Young's modulus of the material of each of the first reinforcing portion 24 and the second reinforcing portion 25 is greater than Young's modulus of the material of the first resin portion 21 and the second resin portion 22. Examples of the material of each of the first resin portion 21, the second resin portion 22, the first reinforcing portion 24, and the second reinforcing portion 25 include polypropylene (PP). Examples of the material of each of the first resin portion 21, the second resin portion 22, the first reinforcing portion 24, and the second reinforcing portion 25 include oriented polypropylene (OPP). Examples of the material of each of the first resin portion 21, the second resin portion 22, the first reinforcing portion 24, and the second reinforcing portion 25 include biaxially oriented polypropylene. Alternatively, examples of the material of each of the first resin portion 21, the second resin portion 22, the first reinforcing portion 24, and the second reinforcing portion 25 include cast polypropylene (CPP). For example, the tensile strength and the Young's modulus are measured by a method defined in HS K 7127.

Figure 6:
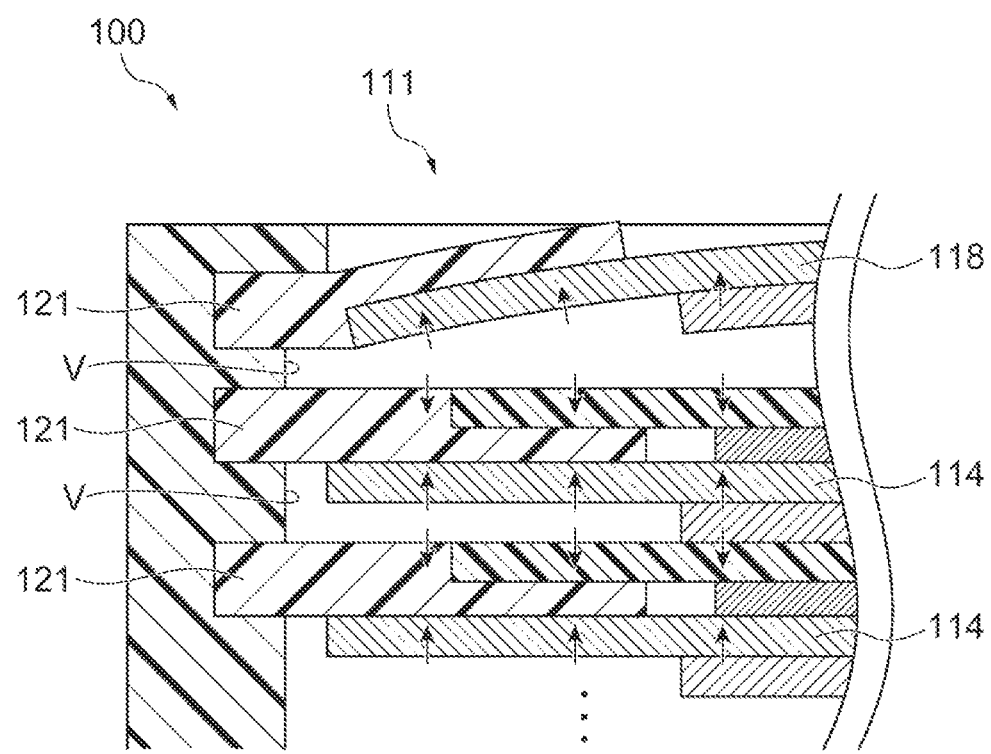
FIG. 6 is an enlarged cross-sectional view of a part of an electricity-storage module according to a comparative example.
Figure 7:
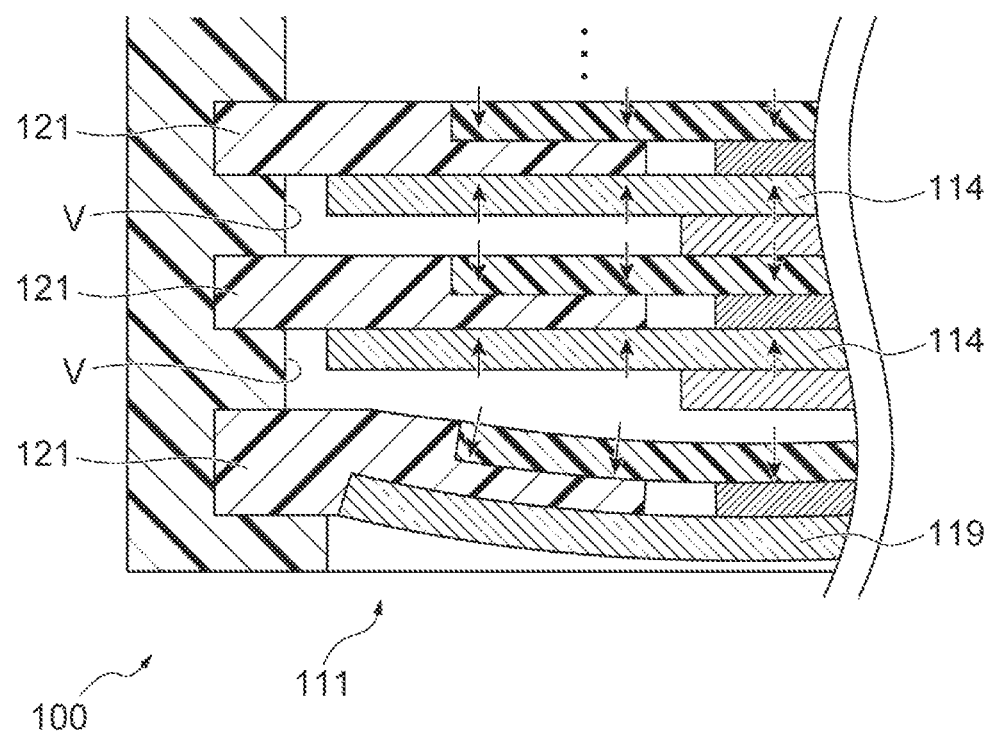
FIG. 7 is an enlarged cross-sectional view of a part of the electricity-storage module according to the comparative example.

Next, an operation and an effect of the electricity-storage module 4 will be described. FIG. 6 is an enlarged cross-sectional view of a main section and illustrates a state of a negative terminal electrode when an inner pressure increases in an electricity-storage module according to a comparative example. FIG. 7 is an enlarged cross-sectional view of a main section and illustrates a state of a positive terminal electrode when the inner pressure increases in the electricity-storage module according to the comparative example. As illustrated in FIG. 6 and FIG. 7, an electricity-storage module 100 according to the comparative example does not include the first reinforcing portion 24 and the second reinforcing portion 25, and is different from the electricity-storage module 4 according to the embodiment.

In the electricity-storage module 100, in a case where an inner pressure of an inner space V between bipolar electrodes 114 and 114 increases in accordance with use conditions, or the like, in an intermediate layer of the electrode stacked body 111, a load due to the inner pressure of the inner space V adjacent in the stacking direction is cancelled. In addition, the inner space V is also a small space, and thus deformation of the bipolar electrodes 114 is relatively less likely to occur.

On the other hand, in a negative terminal electrode 118 and a positive terminal electrode 119 which are located at stacking ends of the electrode stacked body 111, the load due to the inner pressure of the inner space V is not cancelled differently from the intermediate layer. According to this, it is considered that the negative terminal electrode 118 and the positive terminal electrode 119 are deformed to an outer side in the stacking direction D in a case where the inner pressure increases. When the negative terminal electrode 118 and the positive terminal electrode 119 are deformed, an excessive stress is applied to a first resin portion 121, and thus the first resin portion 121 may be broken or a gap may occur between the first resin portion 121, and the negative terminal electrode 118 and the positive terminal electrode 119. Breakage of the first resin portion 121, or formation of the gap between the first resin portion 121, and the negative terminal electrode 118 and the positive terminal electrode 119 may become the cause for leakage of an electrolytic solution (not illustrated) to the outside of the electrode stacked body 111.

In contrast, in the electricity-storage module 4, electrodes include the plurality of bipolar electrodes 14 and the negative terminal electrode 18 disposed on one end of the electrode stacked body 11 in the stacking direction D. The sealing body 12 includes the plurality of first resin portions 21 which are welded to the first surface 15a of the electrodes at the peripheral edge portion 15c of the electrodes, and the second resin portion 22 that is joined to the first resin portions 21 so as to surround the plurality of first resin portions 21 from an outer side in the stacking direction D. The reinforcing body 23 includes the first reinforcing portion 24 that is joined to the second surface 15b of the negative terminal electrode 18. In this manner, in the bipolar electrodes 14, the first resin portion 21 is welded to the first surface 15a. In contrast, in the negative terminal electrode 18, the first resin portion 21 is welded to the first surface 15a, and the first reinforcing portion 24 is joined to the second surface 15b. Accordingly, for example, in a case where the inner pressure of the inner space V increases, deformation of the negative terminal electrode 18 is suppressed, and leakage of an electrolytic solution and breakage (for example, breakage of the first resin portion 21) on the negative terminal electrode 18 side are suppressed. As a result, according to the electricity-storage module 4, reliability can be improved.

In addition, in the electricity-storage module 100, due to a so-called alkali creep phenomenon, an electrolytic solution may be transferred onto an electrode plate of the negative terminal electrode 118, passes through a gap between the first resin portion 121 of the sealing body and the electrode plate, and may be seeped to an outer side of the inner space V. The alkali creep phenomenon may occur during charging and discharging of the electricity-storage device, and during no load due to an electrochemical factor and a fluid phenomenon, or the like. The alkali creep phenomenon occurs due to existence of a negative electrode potential, moisture, and a passage of the electrolytic solution. In contrast, according to the electricity-storage module 4, as described above, in the negative terminal electrode 18, the first resin portion 21 is welded to the first surface 15a, and the first reinforcing portion 24 is joined to the second surface 15b. According to this, a seeping route of the electrolytic solution is lengthened, and thus leakage of the electrolytic solution is suppressed.

In addition, in the electricity-storage module 4, the electrodes include the positive terminal electrode 19, and the positive terminal electrode 19 includes the electrode plate 15 and the positive electrode 16 provided on the first surface 15a, and is disposed at the other end of the electrode stacked body 11 in the stacking direction D such that the first surface 15a faces an inner side of the electrode stacked body 11 in the stacking direction D. The reinforcing body 23 includes the second reinforcing portion 25 joined to the second surface 15b of the positive terminal electrode 19 in the peripheral edge portion 15c of the positive terminal electrode 19. In this manner, in the bipolar electrode 14, the first resin portion 21 is welded to the first surface 15a, in contrast, in the positive terminal electrode 19, the first resin portion 21 is welded to the first surface 15a as in the negative terminal electrode 18 side, and the second reinforcing portion 25 is joined to the second surface 15b. According to this, deformation of the positive terminal electrode 19 is suppressed, and leakage of the electrolytic solution or breakage (for example, breakage of the first resin portion 21) on the positive terminal electrode 19 side is suppressed. According to this, the reliability of the electricity-storage module 4 is further improved.

In addition, in the electricity-storage module 4, the first reinforcing portion 24 and the second reinforcing portion 25 are joined to the second resin portion 22 in combination with the first resin portion 21. According to this, in addition to the first resin portion 21, the first reinforcing portion 24 and the second reinforcing portion 25 are applicable to sealing of the inner space V.

In addition, in the electricity-storage module 4, the tensile strength of the material of the first reinforcing portion 24 and the second reinforcing portion 25 is greater than the tensile strength of the material of the first resin portion 21. According to this, the negative terminal electrode 18 and the positive terminal electrode 19 are more reliably reinforced due to the first reinforcing portion 24 and the second reinforcing portion 25. As a result, deformation of the negative terminal electrode 18 and the positive terminal electrode 19 is more reliably suppressed.

In addition, in the electricity-storage module 4, the Young's modulus of the material of the first reinforcing portion 24 and the second reinforcing portion 25 is greater than the Young's modulus of the material of the first resin portion 21. According to this, the negative terminal electrode 18 and the positive terminal electrode 19 are more reliably reinforced by the first reinforcing portion 24 and the second reinforcing portion 25. As a result, deformation of the negative terminal electrode 18 and the positive terminal electrode 19 is more reliably suppressed.

In addition, in the electricity-storage module 4, even in a case where the material of the first reinforcing portion 24 and the second reinforcing portion 25 is any one of polypropylene, oriented polypropylene, and biaxially oriented polypropylene, the negative terminal electrode 18 and the positive terminal electrode 19 are more reliably reinforced by the first reinforcing portion 24 and the second reinforcing portion 25. As a result, deformation of the negative terminal electrode 18 and the positive terminal electrode 19 is more reliably suppressed.

Hereinbefore, description has been given of the embodiment, but aspects of the invention are not limited to the embodiment.

FIG. 8 is a schematic cross-sectional view illustrating an internal configuration of an electricity-storage module according to a modification example. As illustrated in FIG. 8, the second resin portion 22 includes an overlapping portion 26. Specifically, the overlapping portion 26 includes a first overlapping portion 27 provided in one end of the electrode stacked body 11 so as to overlap the negative terminal electrode 18 when viewed from the stacking direction D, and a second overlapping portion 28 provided in the other end of the electrode stacked body 11 so as to overlap the positive terminal electrode 19 when viewed from the stacking direction D.

The first overlapping portion 27 is formed in a rectangular annular shape when viewed from the stacking direction D, and overlaps the first resin portion 21, the electrode plate 15, and the first reinforcing portion 24 over the entire periphery of the peripheral edge portion 15c of the negative terminal electrode 18, The first overlapping portion 27 is welded to a surface of the first resin portion 21 which is opposite to the negative terminal electrode 18, and is air-tightly (liquid-tightly) joined to the first resin portion 21. An inner edge 27c of the first overlapping portion 27 matches the inner edge 21c of the first resin portion 21 and the inner edge 24c of the first reinforcing portion 24.

When viewed from the stacking direction D, the second overlapping portion 28 is formed in a rectangular annular shape, and overlaps the first reinforcing portion 24, the electrode plate 15, and the first resin portion 21 over the entire periphery of the peripheral edge portion 15c of the positive terminal electrode 19. The second overlapping portion 28 is welded to a surface of the second reinforcing portion 25 which is opposite to the positive terminal electrode 19, and is air-tightly (liquid-tightly) joined to the second reinforcing portion 25. An inner edge 28c of the second overlapping portion 28 matches the inner edge 25c of the second reinforcing portion 25, and the inner edge 21c of the first resin portion 21. According to the configuration, the negative terminal electrode 18 and the positive terminal electrode 19 are reinforced by the first overlapping portion 27 and the second overlapping portion 28, and thus deformation of the negative terminal electrode 18 and the positive terminal electrode 19 is more reliably suppressed.

In addition, the material of each of the first resin portion 21, the second resin portion 22, the first reinforcing portion 24, and the second reinforcing portion 25 may be mono-oriented polypropylene. Even in this case, the negative terminal electrode 18 and the positive terminal electrode 19 are more reliably reinforced by the first reinforcing portion 24 and the second reinforcing portion 25, and thus deformation of the negative terminal electrode 18 and the positive terminal electrode 19 is more reliably suppressed. In addition, the material of each of the first resin portion 21, the second resin portion 22, the first reinforcing portion 24, and the second reinforcing portion 25 may be acid-modified polypropylene, modified polyphenylene ether, polypropylene, or a thermoplastic elastomer obtained by mixing a rubber component and polypropylene, or the like.

In addition, the material of the first reinforcing portion 24 and the second reinforcing portion 25 may be the same as that of the first resin portion 21. In this case, materials can be made common.

In addition, in the embodiment, description has been given of an example in which the inner edge 24c of the first reinforcing portion 24 matches the inner edge 21c of the first resin portion 21, but the inner edge 24c of the first reinforcing portion 24 may not match the inner edge 21.c of the first resin portion 21. For example, the inner edge 24c of the first reinforcing portion 24 may be located on a further inner side in comparison to the inner edge 21c of the first resin portion 21. Similarly, the inner edge 25c of the second reinforcing portion 25 may not match the inner edge 21c of the first resin portion 21. For example, the inner edge 25c of the second reinforcing portion 25 may be located on a further inner side in comparison to the inner edge 21c of the first resin portion 21. In this case, the negative terminal electrode 18 and the positive terminal electrode 19 are more reliably reinforced by the first reinforcing portion 24 and the second reinforcing portion 25.

In addition, description has been given of an example in which the inner edges 21c of the plurality of first resin portion 21 match each other. However, for example, the inner edge 21c of the first resin portion 21 welded to the negative terminal electrode 18 and the inner edge 21c of the first resin portion 21 welded to the positive terminal electrode 19 may be located on a further inner side in comparison to the outer edge 16d of the positive electrode 16 or the outer edge 17d of the negative electrode 17. That is, the inner edge 21c of the first resin portion 21 welded to the negative terminal electrode 18, and the inner edge 21c of the first resin portion 21 welded to the positive terminal electrode 19 may extend so as to overlap the positive electrode 16 or the negative electrode 17. In this case, the negative terminal electrode 18 and the positive terminal electrode 19 are more reliably reinforced by the first resin portion 21.

In addition, as described above, from the viewpoint of suppressing leakage due to the alkali creep, it is important to provide the first reinforcing portion 24 with respect to the negative terminal electrode 18. According to this, the reinforcing body 23 may not include the second reinforcing portion 25 from the same viewpoint.

REFERENCE SIGNS LIST

4: electricity-storage module, 11: electrode stacked body (stacked body), 12: sealing body, 14: bipolar electrode, 15: electrode plate, 15a: first surface, 15b: second surface, 15c: peripheral edge portion, 16: positive electrode, 17: negative electrode, 18: negative terminal electrode, 19: positive terminal electrode, 21: first resin portion (first sealing portion), 22: second resin portion (second sealing portion), 23: reinforcing body; 24: first reinforcing portion, 25: second reinforcing portion, 26: overlapping portion, 27: first overlapping portion, 28: second overlapping portion, D: stacking direction (first direction), V: inner space.

The invention claimed is:

1. An electricity-storage module comprising:
a stacked body that includes a plurality of electrodes which are stacked along a first direction;

a sealing body that is provided to the stacked body so as to surround a peripheral edge portion of the electrodes, forms an inner space that stores an electrolytic solution between the electrodes adjacent to each other along the first direction, and seals the inner space; and a reinforcing body that is provided in the electrodes so as to suppress deformation of the electrodes, wherein the electrodes include a plurality of bipolar electrodes and a negative terminal electrode, the bipolar electrode includes an electrode plate, a positive electrode provided on a first surface of the electrode plate, and a negative electrode provided on a second surface of the electrode plate which is opposite to the first surface, the negative terminal electrode includes the electrode plate and a negative electrode provided on the second surface, and is disposed at one end of the stacked body in the first direction such that the second surface faces an inner side of the stacked body in the first direction, the sealing body includes a plurality of first sealing portions welded to the first surface at a peripheral edge portion of the electrodes, and a second sealing portion joined to the first sealing portion so as to surround the plurality of first sealing portions from an outer side in the first direction, and the reinforcing body includes a first reinforcing portion joined to the second surface of the negative terminal electrode at a peripheral edge portion of the negative terminal electrode.

2. The electricity-storage module according to claim 1, wherein the electrodes further include a positive terminal electrode, the positive terminal electrode includes the electrode plate and a positive electrode provided on the first surface, and is disposed at the other end of the stacked body in the first direction such that the first surface faces an inner side of the stacked body in the first direction, and the reinforcing body further includes a second reinforcing portion joined to the second surface of the positive terminal electrode at a peripheral edge portion of the positive terminal electrode.

3. The electricity-storage module according to claim 1, wherein the reinforcing body is joined to the second sealing portion in combination with the first sealing portion.

4. The electricity-storage module according to claim 1, wherein the second sealing portion includes an overlapping portion provided in one end and the other end of the stacked body so as to overlap the electrodes when viewed from the first direction.

5. The electricity-storage module according to claim 1, wherein tensile strength of a material of the reinforcing body is greater than tensile strength of a material of the first sealing portion.

6. The electricity-storage module according to claim 1, wherein Young's modulus of the material of the reinforcing body is greater than Young's modulus of the material of the first sealing portion.

7. The electricity-storage module according to claim 1, wherein the material of the reinforcing body is polypropylene.

8. The electricity-storage module according to claim 7, wherein the material of the reinforcing body is oriented polypropylene.

9. The electricity-storage module according to claim 8, wherein the material of the reinforcing body is biaxially oriented polypropylene.

10. The electricity-storage module according to claim 1, wherein the material of the reinforcing body is the same as the material of the first sealing portion.

* * * * *